Patented Aug. 11, 1931

1,818,075

UNITED STATES PATENT OFFICE

ARTHUR LUETTRINGHAUS, OF MANNHEIM, HEINRICH NERESHEIMER, OF LUDWIGSHAFEN-ON-THE-RHINE, AND WILLY EICHHOLZ, OF MANNHEIM, GERMANY, ASSIGNORS TO GENERAL ANILINE WORKS, INC., OF NEW YORK, N. Y., A CORPORATION OF DELAWARE

CONDENSATION PRODUCTS AND VAT DYESTUFFS OF THE BENZANTHRONE SERIES

No Drawing. Application filed December 3, 1928, Serial No. 323,562, and in Germany December 8, 1927.

The present invention relates to the production of condensation products and vat dyestuffs of the benzanthrone series.

We have found that valuable new condensation products are obtained by treating with alkaline condensing agents such derivatives of benzanthrones with free 2-position which are combined in the Bzl-position, by a sulfur atom, with a radicle of the general formula $R-CO-CH_2$. In the latter R is a hydrocarbon radicle which may also contain substituents. Accordingly, the initial materials correspond to the general formula:—

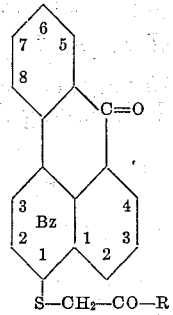

in which R stands for a hydrocarbon radicle also to be substituted, if desired. The resulting compounds probably correspond to the following formula:—

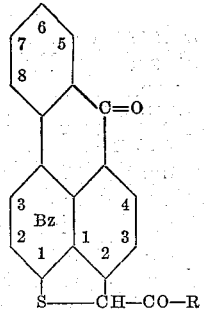

The condensation products are insoluble in dilute acids and are converted by the action of alkalies into salt-like compounds which furnish remarkably intensely colored solutions with, for example, water, alcohol, acetone, and the like.

The formation of these condensation products, generally speaking, takes place very readily. In some cases a mere treatment of the initial materials with dilute aqueous alkalies is sufficient, but, usually, the reaction proceeds more smoothly, when carried out in an organic solvent or suspension medium, such as alcohol or pyridine.

The said condensation products are converted into valuable vat dyestuffs by treating them with hydrolyzing agents having acid or alkaline reaction and, subsequently, oxidizing the products so obtained. The hydrolysis and the oxidation may also be carried out in one operation.

The following examples will further illustrate the nature of the invention, but the invention is not limited to these examples. The parts are by weight.

Example 1

10 parts of acetonyl-Bzl-benzanthronyl sulfide, having the formula:—

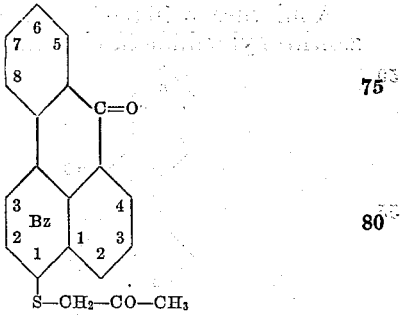

prepared, for example, by the action of monochloracetone on sodium Bzl-benzanthronyl mercaptide, are warmed and stirred at a temperature of from 35° to 40° C. for 6 hours with 5 parts of powdered caustic potash and 50 parts of pyridine. The condensation may also be carried out at room temperature. The initially red brown color of the fluid mass gradually changes to violet and then to blue. The reaction mixture which gradually acquires the consistency of a pulp is dissolved in water. A violet solution is obtained which is acidified with hydrochloric acid. The resulting precipitate can be freed from any Bzl-benzanthronylmercaptane, which may be formed, for example, by extraction with an aqueous solution of sodium sulfide, in which the sodium salt of the new compound is sparingly soluble, and it can be completely purified by crystallization from nitrobenzene.

The resulting substance, which forms orange brown needles, dissolves with difficulty in the usual organic solvents. With concentrated sulfuric acid it furnishes blue green solutions, and with aqueous or alcoholic solutions of an alkali metal hydroxide or even of alkali metal carbonates, very strongly colored violet solutions with intensive scarlet fluorescence.

*Example 2*

10 parts of acetonyl-Bzl-benzanthronyl sulfide are heated and stirred at a temperature of from 55° to 60° C. for 8 hours in 150 parts of a 33 per cent alcoholic caustic potash solution. The reaction mixture is diluted with water and neutralized with hydrochloric acid, the crude product obtained is treated as in Example 1.

*Example 3*

10 parts of acetonyl-Bzl-benzanthronyl sulfide and 5 parts of powdered anhydrous sodium sulfide are thoroughly mixed and heated with 100 parts of pyridine for 7 hours at a temperature of from 55° to 60° C. The blue reaction mass is poured into an ice cold solution of a bisulfite, and the crude product is treated as described above. The resulting substance is identical with that described in Examples 1 and 2.

*Example 4*

A mixture of 10 parts of phenacyl-Bzl-benzanthronyl sulfide having the formula:—

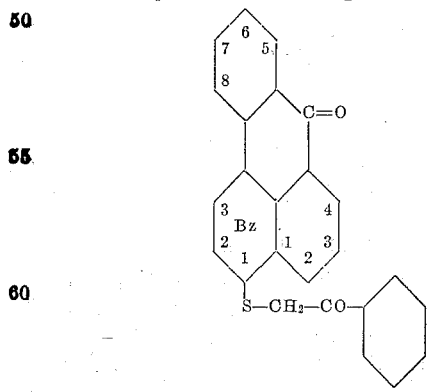

prepared, for example, from omega-bromacetophenone and sodium-Bzl-benzathronyl mercaptide, and 5 parts of caustic potash is introduced into 100 parts of pyridine and heated to a temperature of from 55° to 60° C. for 7 hours. The solution is diluted with water, and the new compound is precipitated by means of hydrochloric acid and purified by way of its sodium salt which, differing from that of the Bzl-benzanthronylmercaptane usually present, is soluble with difficulty in water. The new orange brown ketone is sparingly soluble in most organic solvents. It dissolves to a green solution in concentrated sulfuric acid and gives a remarkably strongly blue solution of a cornflower-like shade in warm aqueous alkali solutions, or in solutions of alkali metal carbonates, in which it dissolves with difficulty, or in alcoholic solutions of alkalies in which it is more readily soluble.

*Example 5*

1 part of acetonyl-Bzl-benzanthronyl sulfide is treated for several hours at 125 to 130° C. with 10 parts of anhydrous sodium sulfide. Sodium sulfide employed in excess and Bzl-benzanthronylmercaptane, which may have been formed, are extracted from the reaction mass with cold water, and the residue is dissolved in hot water and freed by filtration from any undissolved initial material which may still be present. When the red violet solution is acidified a pure product is obtained which is identical with those obtained according to Examples 1 and 2.

*Example 6*

A mixture of 10 parts chlorphenacyl-Bzl-benzanthronyl sulfide having the formula:—

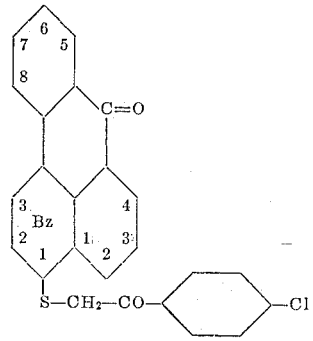

(obtainable, for instance, from p-chlorphenacylchlorid and sodium Bzl-benzanthronyl mercaptide), 5 parts of caustic potash, and 100 parts of pyridine is heated to a temperature of 60 to 70° C. until the mass, being fluid at first, has become pasty. The mass is then diluted with water and acidified with hydrochloric acid. The deposited crude product may be freed from Bzl-benzanthronylmercaptane formed as by-product by boiling it with an aqueous solution of sodium sulfide. By recrystallization from nitrobenzene the new substance can be obtained as red brown needles dissolving to a green solution in concentrated sulfuric acid, being insoluble in cold aqueous solutions of caustic alkalies and on heating sparingly soluble therein to a blue solution.

*Example 7*

1 part of the condensation product obtained from acetonyl-Bzl-benzanthronyl sulfide as described in Example 1 is heated with 10 parts of a 10 per cent aqueous sodium carbonate solution for 10 hours at a temperature of from 150 to 155° C. in an autoclave. The product so obtained is purified by extraction with pyridine; it is a blue black powder which is practically insoluble in the usual organic solvents, and is also insoluble in concentrated sulfuric acid. When this product is stirred with sulfuric acid monohydrate for several hours it dissolves completely. By diluting this solution with water a flocculent blue-green precipitate of a vat dyestuff is obtained probably corresponding to the formula:—

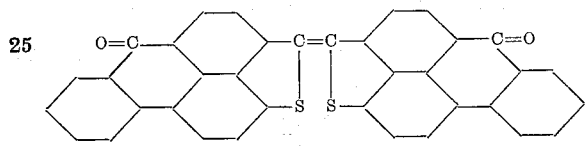

The hydrolysis may be carried out at lower temperatures, but then it proceeds considerably more slowly.

*Example 8*

1 part of the initial material employed in Example 7 is heated with 10 parts of concentrated hydrochloric acid in an autoclave at 150° C. for 10 hours. The purification of the hydrolized product, and the conversion of the same into a dyestuff may be carried out as described in Example 7. Instead of concentrated hydrochloric acid, 82 per cent phosphoric acid may be employed.

*Example 9*

By heating 1 part of the initial material employed in Example 7 with a solution of 1 part of sodium peroxide in 10 parts of water at 160° C. in an autoclave for 10 hours, the dyestuff described in Example 7 is obtained in one operation. The dyestuff may be purified by extraction with pyridine.

A solution of 1 part of sodium carbonate and 1 part of ammonium persulfate may be employed instead of the solution of sodium peroxide.

*Example 10*

1 part of the condensation product which can be prepared according to example 4 is heated with 10 parts of 78 per cent sulfuric acid for 4 hours at 140° to 145° C. whereby sulfurous acid is liberated. The solution is cooled, and the dyestuff which separates out is filtered off with suction and purified, for example, by extraction with pyridine. Part of the dyestuff is present in the form of a sulfonic acid which may be removed by washing out the product with a 10 per cent aqueous solution of pyridine.

What we claim is:—

1. A process for the production of condensation products of the benzanthrone series, which comprises treating a derivative of benzanthrone of the general formula:—

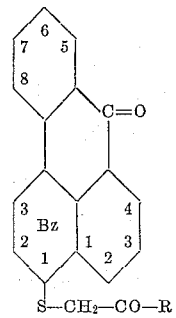

in which R stands for an alkyl or aryl group which may be substituted, and in which the 2-position must be unoccupied, with an alkaline condensing agent.

2. A process for the production of condensation products of the benzanthrone series, which comprises treating a derivative of benzanthrone of the general formula:

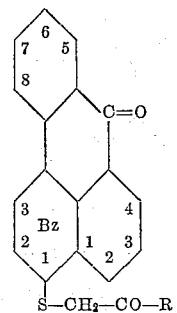

in which R stands for a alkyl or aryl group which may be substituted, and in which the 2-position must be unoccupied, with an alkaline condensing agent in an organic solvent.

3. A process for the production of condensation products of the benzanthrone series, which comprises treating a derivative of benzanthrone of the formula:—

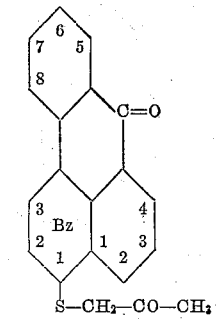

with an alkaline condensing agent in an organic solvent.

4. A process for the production of vat dyestuffs of the benzanthrone series, which comprises treating a derivative of benzanthrone of the general formula:—

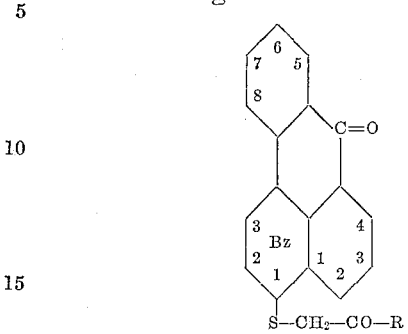

in which R stands for an alkyl or aryl group which may be substituted, and in which the 2-position must be unoccupied, with an alkaline condensing agent and converting the condensation product into a vat dyestuff by hydrolyzation and oxidation.

5. A process for the production of vat dyestuffs of the benzanthrone series, which comprises treating a derivative of benzanthrone of the formula:—

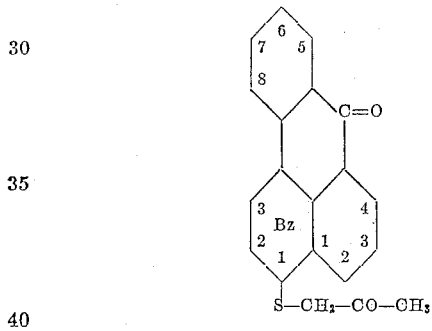

with an alkaline condensing agent and converting the condensation product into a vat dyestuff my hydrolyzation and oxidation.

6. A process for the production of vat dyestuffs of the benzanthrone series, which comprises treating a derivative of benzanthrone of the formula:—

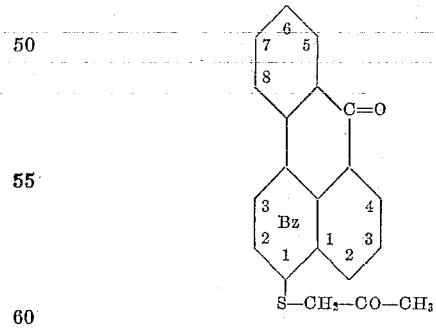

with an alkaline condensing agent and converting the condensation product into a vat dyestuff by treating it with an aqueous solution of sodium peroxid under pressure.

7. As new articles of manufacture condensation products of the benzanthrone series corresponding to the general formula:

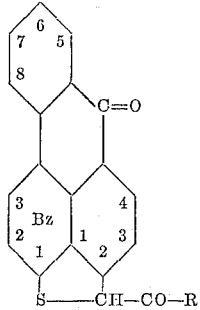

in which R stands for an alkyl or aryl group which may be substituted, the said products being insoluble in dilute acids and convertible by the action of alkalies into salt-like compounds furnishing intensely colored solutions in alcohol, and into vat dyestuffs by hydrolyzation and oxidation.

8. As a new article of manufacture the compound corresponding to the formula:—

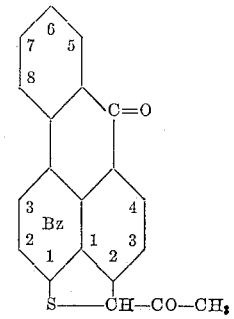

forming orange brown needles when crystallized from nitrobenzene, dissolving to a blue solution in concentrated sulfuric acid and to a violet solution with intensive scarlet fluorescence in an alcoholic solution of alkali metal hydroxids.

In testimony whereof we have hereunto set our hands.

ARTHUR LUETTRINGHAUS.
HEINRICH NERESHEIMER.
WILLY EICHHOLZ.